US012689588B2

(12) United States Patent
Kovacik et al.

(10) Patent No.:     US 12,689,588 B2
(45) Date of Patent:         Jul. 21, 2026

(54) ISCSI LOAD BALANCING FOR MULTIPLE SDS LUNS

(71) Applicant: SOFTIRON LIMITED, Chilworth (GB)

(72) Inventors: Milan Kovacik, Brno (CZ); Kenneth Van Alstyne, Mechanicsville, VA (US); Stephen Hardwick, Austin, TX (US)

(73) Assignee: SOFTIRON LIMITED, London (GB)

( * ) Notice: Subject to any disclaimer, the term of this patent is extended or adjusted under 35 U.S.C. 154(b) by 329 days.

(21) Appl. No.: 18/349,487

(22) Filed: Jul. 10, 2023

(65)          Prior Publication Data

US 2024/0129237 A1      Apr. 18, 2024

Related U.S. Application Data

(60) Provisional application No. 63/359,253, filed on Jul. 8, 2022.

(51) Int. Cl.
H04L 47/125      (2022.01)
H04L 45/24      (2022.01)

(52) U.S. Cl.
CPC ............ H04L 47/125 (2013.01); H04L 45/24 (2013.01)

(58) Field of Classification Search
CPC .............................. H04L 47/125; H04L 45/24
See application file for complete search history.

(56)         References Cited

U.S. PATENT DOCUMENTS

| | | | | |
|---|---|---|---|---|
| 7,724,746 | B2 * | 5/2010 | Valtchev ................. | H04L 12/66 709/229 |
| 9,800,517 | B1 * | 10/2017 | Anderson ........... | H04L 63/0428 |
| 2016/0239239 | A1 * | 8/2016 | Tin ........................ | G06F 3/0611 |
| 2019/0220375 | A1 * | 7/2019 | Furuya ............... | G06F 11/1658 |
| 2019/0235959 | A1 * | 8/2019 | Ainscow ............. | G06F 11/2087 |
| 2022/0206871 | A1 * | 6/2022 | Armangau ............ | G06F 9/5027 |
| 2023/0103809 | A1 * | 4/2023 | Charles ................... | H04L 45/24 370/410 |

* cited by examiner

*Primary Examiner* — Farley Abad

(74) *Attorney, Agent, or Firm* — Slayden Grubert Beard PLLC

(57)          ABSTRACT

An apparatus includes a processor and instructions to cause the processor to identify a client to connect a logical unit number (LUN) in a software defined system (SDS) through a mesh network through gateway nodes. The mesh network includes Asymmetric Logical Unit Access (ALUA) port groups, each ALUA port group including possible connection to each of the LUNs and the client. Each gateway node includes an instance of each of the ALUA port groups. The processor balances a bandwidth load for a given ALUA across each of the gateway nodes through assignment of the LUNs in the given ALUA across the gateway nodes and to select, as a preferred path, a path from the client through a selected one of the gateway nodes to an assigned LUN from the assignment of the LUNs in the given ALUA across the gateway nodes.

18 Claims, 6 Drawing Sheets

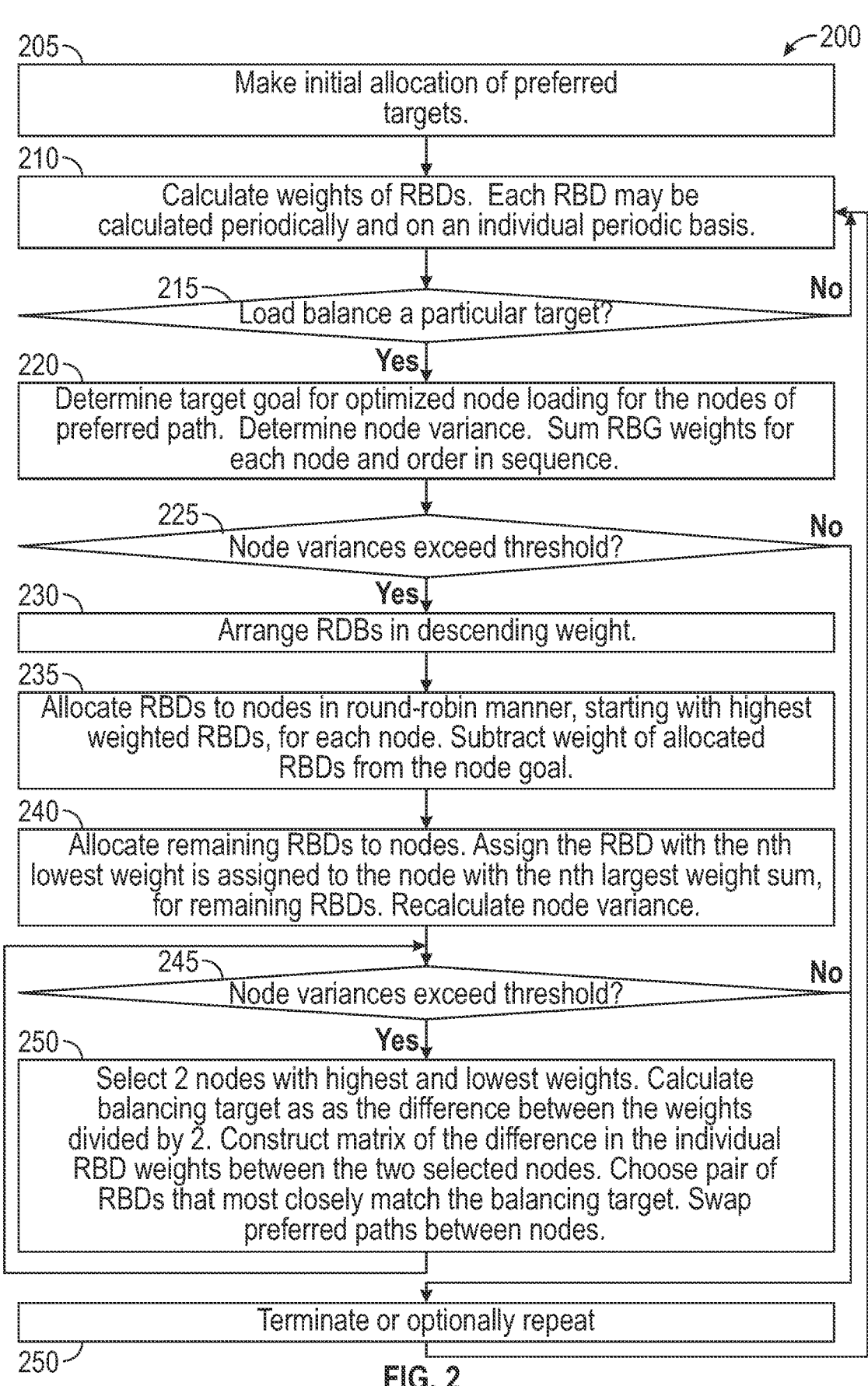

205 — Make initial allocation of preferred targets.

210 — Calculate weights of RBDs. Each RBD may be calculated periodically and on an individual periodic basis.

215 — Load balance a particular target?    No

Yes↓

220 — Determine target goal for optimized node loading for the nodes of preferred path. Determine node variance. Sum RBG weights for each node and order in sequence.

225 — Node variances exceed threshold?    No

Yes↓

230 — Arrange RDBs in descending weight.

235 — Allocate RBDs to nodes in round-robin manner, starting with highest weighted RBDs, for each node. Subtract weight of allocated RBDs from the node goal.

240 — Allocate remaining RBDs to nodes. Assign the RBD with the nth lowest weight is assigned to the node with the nth largest weight sum, for remaining RBDs. Recalculate node variance.

245 — Node variances exceed threshold?    No

Yes↓

250 — Select 2 nodes with highest and lowest weights. Calculate balancing target as as the difference between the weights divided by 2. Construct matrix of the difference in the individual RBD weights between the two selected nodes. Choose pair of RBDs that most closely match the balancing target. Swap preferred paths between nodes.

Terminate or optionally repeat

ISCSI LOAD BALANCING FOR MULTIPLE SDS LUNS

PRIORITY

This application claims priority from U.S. Provisional Patent Application No. 63/359,253 filed Jul. 8, 2022, the contents of which are hereby incorporated in their entirety.

FIELD OF THE INVENTION

The present disclosure relates to electronic storage and, more particularly, to Internet Small Computer Systems Interface (iSCSI) load balancing for multiple software defined system (SDS) Logical Unit Numbers (LUN).

BACKGROUND

An SDS may allow user data to be evenly distributed across multiple storage devices in a pseudorandom fashion. The devices used to store this data, such as hard drives or solid-state disks, can be contained within the SDS server, or be part of a remote storage solution. A Storage Area Network (SAN) can be used to provide the external remote devices.

iSCSI has traditionally been a protocol of choice for exporting block devices in a SAN environment. A Reliable Autonomic Distributed Object Store (RADOS) Block Device (RBD) can be directly connected to the iSCSI network as a LUN. This may provide an iSCSI interface to any iSCSI targets of any clients of the system. The term RBD may be used to represent the LUN and associated RBD. A target may refer to an object, such as a data structure with available methods and functions. A target may be connected or assigned to various elements of an iSCSI system. A target may be assigned to a virtual drive and to an RBD. An initiator may be assigned to multiple drives in a same device, and thus an initiator and an RBD may be assigned to multiple targets. A virtual drive in a client device is exported, virtually connected, to an RDB. This is accomplished by using a target to connect explicitly to/from the associated initiator and RBD.

Inventors of embodiments of the present disclosure have discovered that a challenge with this type of architecture is ensuring that the load is evenly distributed between the various network interfaces of the architecture. This may include those network interfaces that are distributed across multiple discrete storage controllers, to use the parlance of traditional SAN applications. In a standard iSCSI implementation, targets of intermediate elements within the architecture between a client and RBDs are created as a set on each given iSCSI gateway node. These sets may be grouped together in each node using an Asymmetric Logical Unit Access (ALUA). Each node may contain multiple ALUAs. Multiple nodes may contain the same ALUA instance. This may result in a LUN or RBD having multiple connections to the same target in each ALUA on each different node. This can be a physical drive. This arrangement may provide redundant paths through the network. The LUN or RBD may choose one of those paths as a preferred path, so that the LUN or RBD can switch to another redundant path if the preferred path fails on a different node using the same ALUA instance.

Inventors of embodiments of the present disclosure have discovered that a further challenge exists to determine which of the multiple possible targets is to be used as the preferred path by the iSCSI infrastructure. Yet a further challenge exists when determining which of the multiple possible targets is to be used as the preferred path when considering the overall load on a given node. One approach may be to attempt to balance the load across the various iSCSI gateway nodes. However, inventors of embodiments of the present disclosure have discovered that this may be difficult because each ALUA or node may be independent of the other ALUAs or nodes. Independence may result in a distributed approach to balancing the load across the nodes and ALUAs.

Inventors of embodiments of the present disclosure have discovered that a disadvantage of balancing the load across various ALUAs and iSCSI gateway nodes may be an increased load on each node. As part of a distributed load balancing solution, each node may continually communicate to all other nodes to assess the overall system loading. Then each node may compute the balancing in concert with the other nodes. This may incur an additional network and compute load to a given node.

Inventors of embodiments of the present disclosure have discovered that a disadvantage of balancing the load across various ALUAs and iSCSI gateway nodes may have a higher probability of utilizing multiple preferred paths. As distributed balancing is performed and preferred targets are reassigned to balance a given load, a LUN or RBD may temporarily be assigned multiple preferred paths. Although this might not compromise the operation of the system, it may provide unnecessary loading within it.

Inventors of embodiments of the present disclosure have discovered that a disadvantage of balancing the load across various ALUAs and iSCSI gateway nodes may be target state thrashing. It may take multiple attempts for a distributed load balancing algorithm to complete a final balanced solution. During the effort to arrive at such a solution, preferred targets may be dynamically reassigned causing rapid network path reassignments. This may cause system resource backlog.

Inventors of embodiments of the present disclosure have discovered that a disadvantage of balancing the load across various ALUAs and iSCSI gateway nodes may be algorithm convergence. Using a distributed load balancing solution may result in difficulty arriving at a balancing solution since each node is working as an independent component. This may result in longer convergence times or even lack of a convergent solution.

Inventors of embodiments of the present disclosure have discovered that a disadvantage of balancing the load across various ALUAs and iSCSI gateway nodes may be target state entropy. The independent nodes may arrive at a solution that moves the preferred targets in a random pattern. This can make it difficult to manage and monitor operation of the system.

Inventors of embodiments of the present disclosure have discovered one or more embodiments that may address one or more of these discovered challenges.

BRIEF DESCRIPTION OF THE DRAWINGS

FIG. 2 is an illustration of load balance convergence, according to embodiments of the present disclosure.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Figure 1A:
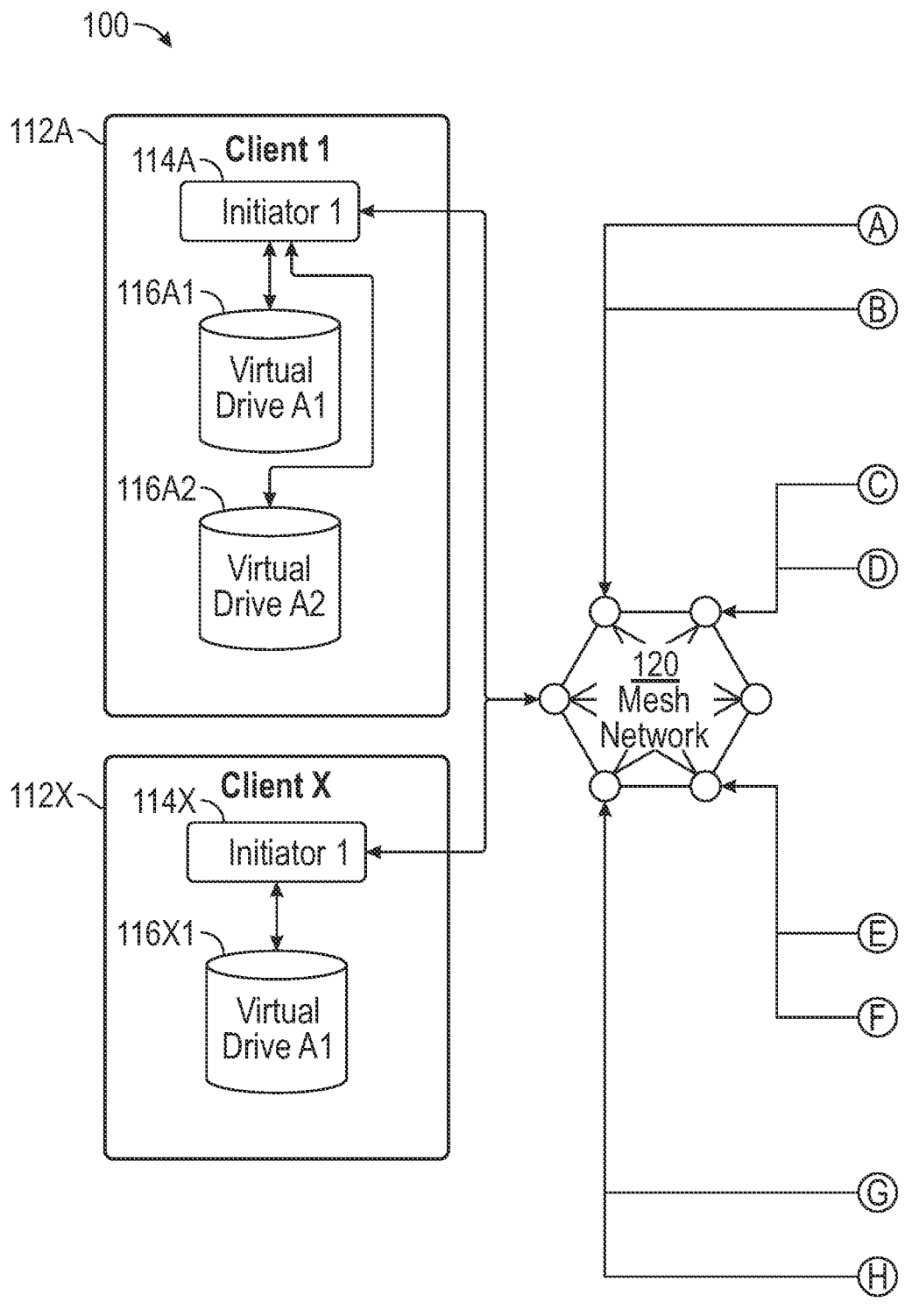
FIGS. 1A-1C are an illustration of an example system for load balancing, according to embodiments of the present disclosure.
Figure 1B:
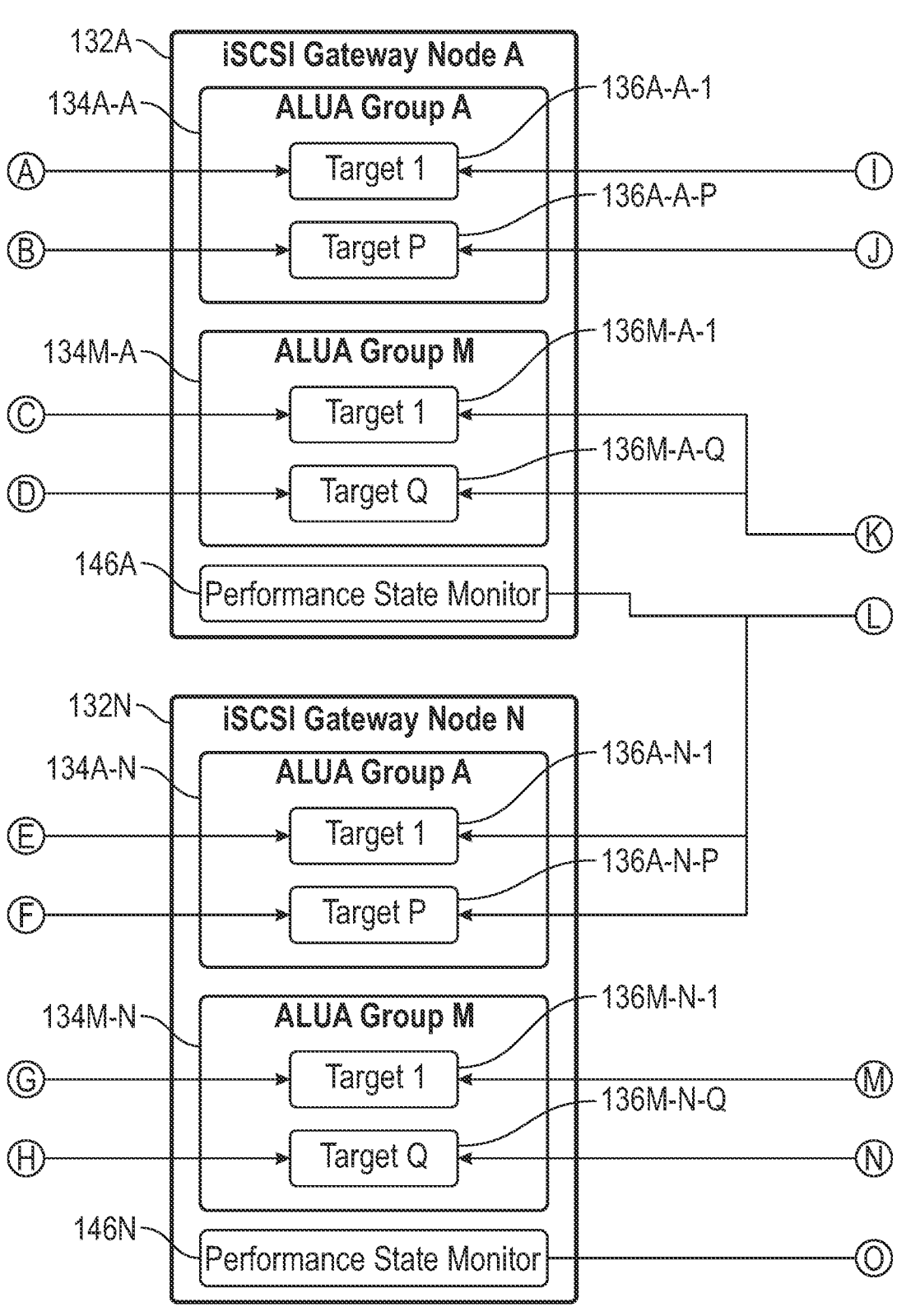
Figure 1C:
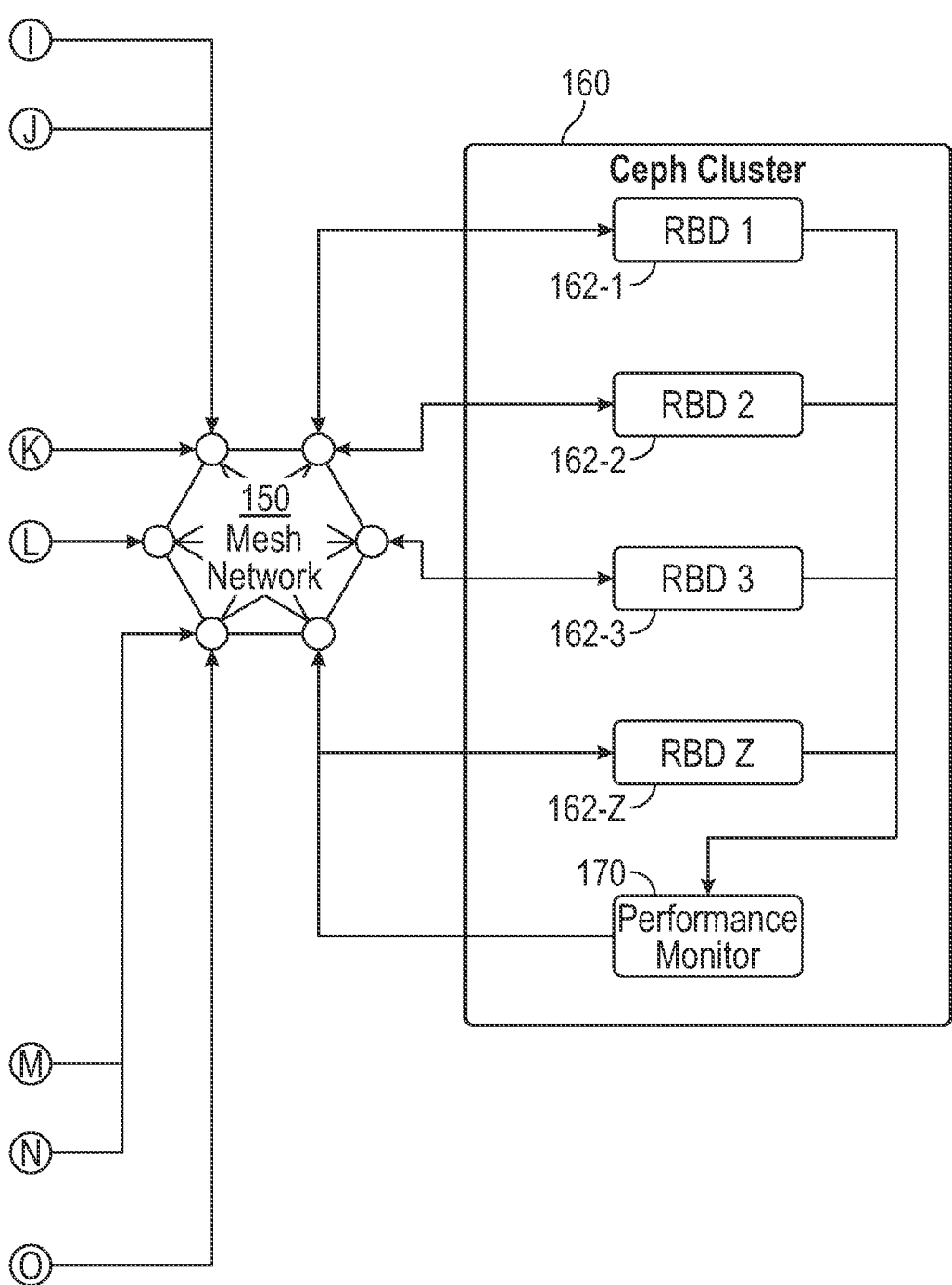

FIGS. 1A-1C are an illustration of an example system 100 for load balancing, according to embodiments of the present disclosure.

Embodiments of the present disclosure include SDS solutions such as Ceph applied to balancing loads with iSCSI for multiple LUNs. Although Ceph may have a disadvantage of acting as a large set of data interfaces such as RBDs, Ceph may be controlled as a single entity. This may facilitate an approach whereby a load balancing solution may be derived from a central location. A centralized solution of embodiments of the present disclosure may address one or more disadvantages of distributed approaches as discussed above. Further, if an RDB fails, not only will Ceph reallocate data usage internally to an associated cluster, it may also reflect them into the iSCSI network loading. This provides a more dynamic approach to device failure.

A set of clients 112 may be established to access a cluster 160 using multipath mesh networks 120 and 150. Cluster 160 may be an SDS cluster, such as a Ceph cluster. Clients 112 may be implemented in any suitable manner. For example, each client 112 may be a computer, server, or any other suitable electronic device. Cluster 160 may be implemented in any suitable manner, such as by a Ceph interface to actual storage devices (not shown). Mesh networks 120, 150 may be implemented in any suitable network topography or protocol. There may be, for example, X different clients 112. This may enable multiple network connectivity within system 100 between clients 112 and cluster 160.

Each client 112 may include any suitable number and kind of virtual disks or virtual drives 116. The virtual disks or drives may appear to users of client 112 as a unitary or otherwise usable drive. Each virtual drive may be mapped into cluster 160. For example, client 1 112A may include virtual drives 116A1 and 116A2. These may connect to mesh network 120 using iSCSI initiator 114A. Client X 112X may include virtual drive 116X1. This may connect to mesh network 120 using iSCSI initiator 114X. In this manner, multiple clients 112 can connect to the iSCSI infrastructure. Moreover, multiple virtual drives 116 may be handled by a single initiator 114 as shown in client 1 112A. Initiators 114 may be a separate software application within an operating system of a given client 112, or implemented as an integral part of the hardware used to implement the mesh interface. Initiators 114 may be configured to connect virtual drives to ALUA targets. A single initiator in a device may connect multiple virtual drives to multiple ALUA targets.

Cluster 160 may be configured to provide storage functions needed by the iSCSI infrastructure. As such, multiple RBD devices 162 may be used to connect to that infrastructure. There may be Z such RBD devices 162. RBD devices 162 may be implemented to provide access to cluster 160 storage locations (not shown), which may be physical storage locations. RBD devices 162 may be configured to communicate to the iSCSI infrastructure via mesh network 150. Ceph cluster 160 may also contain a performance monitor 170 configured to measure specific RBD 162 performance values that may be used in dynamic load balancing as described later. Monitor 170 may be a separate software application within cluster 160 implementation.

Between clients 112 and cluster 160, a set of iSCSI gateway nodes 132 may connect multiple paths between networks 120, 150. There may be N such nodes 132. Each node 132 may include one or more ALUAs. For the purposes of illustration in FIGS. 1A-1C, there may be M such ALUAs in a given node 132. Examples of ALUAs may be denoted using the notation 134<ALUA group>-<Node>, as ALUA group A 134A and ALUA group M 134M in respective nodes 132A and 132N. The first letter of the enumeration of a given ALUA group may indicate the ALUA group and the second letter may indicate the respective node in which the ALUA group resides. For example, ALUA group 134A may be resident in both nodes 132A, 132N, and when referencing ALUA group 134A in node 132A, the ALUA group may be referred to as ALUA group 134A-A. Similarly, when referencing ALUA group 134A in node 132N, the ALUA group may be referred to as ALUA group 134A-N.

Each ALUA group may include any suitable number of targets. For example, ALUA group A 134A may include P targets 136A-1 through 136A-P, and ALUA group M 134M may include Q targets 136M-1 through 136M-Q. P and Q may be a same value. Other ALUA groups, not shown, may in turn include a different number of respective targets, not shown. Targets 136 may be further designated as resident within a specific instance of an ALUA group in a specific node. For example, targets 136A-1 through 136A-P of ALUA group A 134A may be designated as targets 136A-A-1 through 136A-A-P in node A 132A, while being designated as targets 136A-N-1 through 136A-N-P in node N. Thus, the target designation may be 136[ALUA Group]-[node]-[target].

Each ALUA group may assign individual ones of its respective targets 136 to the iSCSI infrastructure, i.e., client initiators 114 via iSCSI Gateway nodes 132 and mesh network 120. A virtual drive 114 may be associated with a specific RBD 162. The target may then also connect to that RBD 162, via iSCSI Gateway nodes 132 and mesh network 120. The specific target 136 will then create the actual connection between a specific client initiator 114 and associated RBD 162. Targets 136, 142 may be connected to the various RBDs 162 and client initiators 114 using mesh networks 150, 120, respectively. A selected one of targets 136, 142 within each ALUA group may have a defined path to an RDB 162 and a defined path to virtual drive 116 via its associated initiator 114. This may result in each RBD 162 and initiator 114 having multiple connections—such as to each of the nodes 132 through a single target in each ALUA group of each node 132. A specific configuration is chosen for each RBD 162 and for each initiator 114 that is defined as the preferred path. A given RBD 162 may use this preferred path to communicate with its corresponding initiator 114.

Each client 112 may thus create a virtual drive 116 which may connect to nodes 132 via initiator 114. Node 132 may connect to cluster 160 at an RBD 162. RBD 162 may provide data, via RADOS, to the physical drive (not shown) in cluster 160. Multiple instances of nodes 132 may provide redundancy. Each node 132 may include a separate network connection between initiator 114 and an associated RBD 162. A specific nomenclature is used for identifying each target 134<ALUA Group>-<Node>-<target number>. For example, client 112A may connect to target 1 in ALUA group A in each node—thus yielding target 1 136A-A-1 in ALUA group A 134A-A in node A 132A, and target 1 136A-N-1 in ALUA group N 134A-N in node N 132N. Similarly, RBD 2 162B may connect to target 1 in ALUA group A in each node—thus target 1 136A-A-1 in ALUA group A 134A in node A 132A, and target 1 136A-N-1 in ALUA group A 134A-N in node N 132N. However, the connection between RBD2 162B and client 112A through target 1 136A-N-1 in ALUA group A 134A-N in node N 132N may be preferred over the other path. However, if the preferred path fails, then all of the connections may be immediately routed instead through the path through node A 132A using ALUA group A 134A-A.

An example configuration may contain twelve RBD 162 instances, two clients 112, and four nodes 132. Each client 112 may be assigned a single RBD 162 for each virtual drive 116 therein. Each client 112 and virtual drive 116 may be assigned an RBD 162 via a target in an ALUA group. Not all RBDs 162, nodes 132, ALUAs, targets, clients 112, or virtual drives 116 are shown in FIGS. 1A-1C for simplicity. For illustration purposes, only one ALUA will be used for simplicity of demonstration, although in reality multiple ALUAs may be implemented and balanced. It may be assumed that client 1 virtual drive 116A1 will be exported to RBD 2 162B, while client 2 virtual drive 116X1 will be exported to RBD 8 162H. Consequently, each ALUA 134 may contain a respective target 136 for each instance of RBD 162 wherein the instance of RBD 162 is requested by a client 112. Thus, RBD 1 162A may be connected to target 136A-A-1, RBD 2 162B may be connected to target 136A-A-2, etc. through RBD 12 162L which may be connected to target 136A-A-12. These connections may exist across each node 132. For example, RBD 1 162A may connect, using ALUA group A, to target 1 136A-A-1 in node A 132A, target 1 136A-B-1 in node B 132B, target 1 136A-C-1 in node C 132C, and target 1 136A-D-1 in node D 132D. RDB 2 162B may connect, using ALUA group B, to target 2 136B-A-2 in node A 132A, target 2 136B-B-2 in node B 132B, target 2 136B-C-2 in node C 132C, and target 136B-D-2 in node D 132D. RBDs 1-12 may connect similarly to nodes A through D via their respective ALUA groups. Even though each RBD 162 has 4 connections through system 100 via the four nodes 132, only one such connection may be used as the preferred target at a single time. Data may be transferred through the preferred target unless there is a failure or other event and a new preferred target chosen. If a new preferred path is chosen, then the previous path is changed to a non-preferred path.

FIG. 2 is an illustration of an example method 200 for balancing loads, according to examples of the present disclosure. Method 200 may include more or fewer steps than shown in FIG. 2, and various steps may be optionally repeated, omitted, performed in parallel, or performed recursively. The order of the steps of method 200 may be changed or performed in any suitable order. Method 200 may be performed by any suitable entity, such as by performance monitor 170, performance state monitors 146, or initiators 114.

At 205, an initial allocation of preferred targets may be made.

The initial allocation of preferred targets within the system may selected in any suitable manner and may be arbitrarily selected. An initial preferred path configuration is presented below.

6

TABLE 1

| Initial preferred path configuration | | | |
| --- | --- | --- | --- |
| RBD | Initial Node | ALUA | Initial Preferred Target |
| RBD 1 | Node A | 134A | 136 A-A-1 |
| RBD 2 | Node B | 134A | 136 A-B-2 |
| RBD 3 | Node C | 134A | 136 A-C-3 |
| RBD 4 | Node D | 134B | 136 B-D-4 |
| RBD 5 | Node A | 134B | 136 B-A-5 |
| RBD 6 | Node B | 134B | 136 B-B-6 |
| RBD 7 | Node C | 134C | 136 C-C-7 |
| RBD 8 | Node D | 134C | 136 C-D-8 |
| RBD 9 | Node A | 134C | 136 C-A-9 |
| RBD 10 | Node B | 134C | 136 C-B-10 |
| RBD 11 | Node C | 134C | 136 C-C-11 |
| RBD 12 | Node D | 134C | 136 C-D-12 |
| Client 1 | Node B | 134A | 136 A-B-2 |
| Client 2 | Node D | 134C | 136 C-D-8 |

As shown above, the path between a given client 112 and a given RBD 162 through a given node 132 may be bifurcated and separately routed.

Over time, however, the loading on a particular node 132 may vary due to the data traffic between RBDs 162 and initiators 114. Typically, load balancing between nodes can be difficult. In one embodiment, an alternative load-balancing scheme may be used based upon the historic target system load data, rather than on a fixed target assignment. Given the fact that initiator 114 may handle brief outages of target availability through, for example, the mechanism of SCSI primary commands-3 (Project T-10), as well as the ability to react to target state changes, the ALUAs 134, 140 target state can be updated dynamically by initiator 114. This may be performed under the assumption that the periodicity of the updates is sufficiently defined to avoid target state thrashing. To prevent data corruption during a target state change, a write-through caching function of the iSCSI interfaces (on the block-level) can be adopted while leveraging the data consistency mechanisms of the underlying SDS system. In the case of both of two nodes rejecting an active target simultaneously, a fast enough (with respect to the timeouts from SCSI Primary Commands-3 (Project T-10)) tie-breaking mechanism may be implemented. When a preferred path is to be changed, the existing node will verify that the new node is available, i.e., that it can support an iSCSI data connection. If the new node is not able to support the transition, i.e., that it has lost power or cannot otherwise sustain a new network connection, the transition may be prevented by the existing node until a new preferred path is available.

The starting point of a dynamic balancing scheme may be to distribute the preferred targets 136 in a fixed assignment, and as the system load evolves, adopt a dynamic update mechanism for a selected subset of the targets 136. Once the initial configuration has been established, at 202 each RBD 162 can be assigned a weight value as follows. The weight value may be a quantification of the relative load of a given node in view of the other loads. The weight value may be a manner of measuring and evaluating bandwidth.

$$RBD\ Weight=(SR*(IOPSR/TPR)*LATR)+(SW*(IOPSW/TPW)*LATW)$$

Where:
 IOPS: Input/output operations per second
 IOPSR: Read IOPS measured at the RBD
 IOPSW: Write IOPS measured at the RBD
 TPR: Read throughput measured at the RBD in Bytes
  Per Second

7

TPW: Write throughput measured at the RBD in Bytes Per Second

LATR: Read Latency in milliseconds (Which takes into account network latency)

LATW: Write Latency in milliseconds (Which takes into account network latency)

8

The following is such an algorithm that can be used to balance the RBD storage locations 162 across the various targets. For simplicity, only the balancing for preferred targets in three ALUA groups A, B and C 134A-C across all four nodes 132 may be discussed. The configuration mentioned earlier will result in the following mapping:

TABLE 2

Preferred Path Initial Selection

|  |  |  |  |  |  |  |  |  | Preferred path |  |  |  |  |
|---|---|---|---|---|---|---|---|---|---|---|---|---|---|
|  | RBD Weighting values |  |  |  |  |  |  |  | Node A | Node B | Node C | Node D |  |  |
| RBD | IOPSR | IOPSW | TPR | TPW | LATR | LATW | Wt. | ALUA | 132A | 132B | 132C | 132D |  |  |
| RBD 1 | N/A | N/A | N/A | N/A | N/A | N/A | 0 | A | X [136A-A-1] | [136A-B-1] | [136A-C-1] | [136A-D-1] |  |  |
| RBD 2 | N/A | N/A | N/A | N/A | N/A | N/A | 0 | A | [136A-A-2] | X [136A-B-2] | [136A-C-2] | [136A-D-2] |  |  |
| RBD 3 | N/A | N/A | N/A | N/A | N/A | N/A | 0 | A | [136A-A-2] | [136A-B-3] | X [136A-C-3] | [136A-D-3] |  |  |
| RBD 4 | N/A | N/A | N/A | N/A | N/A | N/A | 0 | B | [136B-A-4] | [136B-B-4] | [136B-C-4] | [136B-D-4] |  |  |
| RBD 5 | N/A | N/A | N/A | N/A | N/A | N/A | 0 | B | X [136B-A-5] | [136B-B-5] | [136B-C-5] | [136B-D-5] |  |  |
| RBD 6 | N/A | N/A | N/A | N/A | N/A | N/A | 0 | B | [136B-A-6] | X [136B-B-6] | [136B-C-6] | [136B-D-6] |  |  |
| RBD 7 | N/A | N/A | N/A | N/A | N/A | N/A | 0 | C | [136C-A-7] | [136C-B-7] | X [136C-C-7] | [136C-D-7] |  |  |
| RBD 8 | N/A | N/A | N/A | N/A | N/A | N/A | 0 | C | [136C-A-8] | [136C-B-8] | [136C-C-8] | X [136C-D-8] |  |  |
| RBD 9 | N/A | N/A | N/A | N/A | N/A | N/A | 0 | C | X [136C-A-9] | [136C-B-9] | [136C-C-9] | [136C-D-9] |  |  |
| RBD 10 | N/A | N/A | N/A | N/A | N/A | N/A | 0 | C | [136C-A-10] | X [136C-B-10] | [136C-C-10] | [136C-D-10] |  |  |
| RBD 11 | N/A | N/A | N/A | N/A | N/A | N/A | 0 | C | [136C-A-11] | [136C-B-11] | X [136C-C-11] | [136C-D-11] |  |  |
| RBD 12 | N/A | N/A | N/A | N/A | N/A | N/A | 0 | C | [136C-A-12] | [136C-B-12] | [136C-C-12] | X [136C-D-12] |  |  |
|  |  |  |  |  |  |  |  | A | [136A-A-2] | X [136A-B-2] | [136A-C-2] | [136A-D-2] | Initiator 1 | Client 1 |
|  |  |  |  |  |  |  |  | C | [136C-A-8] | [136C-B-8] | [136C-C-8] | X [136C-D-8] | Initiator 2 | Client 2 |

SR: Read Weighting scaling factor, which may take into account relative costs of reads SW: Write Weighting scaling factor, which may take into account relative costs of writes Thus, at 210, a weight of each RBD 162 may be calculated.

The above values may be measured by performance monitor 170 for each RBD 162 connected from cluster 160 to the iSCSI network via mesh network 150. The weight value for each RBD 162 may be periodically measured. The periodicity of the measurement can be set individually for each RBD 162 and may depend on the relative amount of storage it is assigned compared to other RBDs. For example, an RBD 162 with a relatively large amount of storage may be measured more frequently than an RBD 162 with a smaller amount of storage. These values may be cumulatively stored by performance monitor 170 and the current RBD weight appended to a set of previously stored values.

The RBD weight value can be aggregated over a specific time period. This may be done for a given target. This aggregated value may be calculated using any suitable manner, such as a sum of all values, a product of all values, an arithmetic mean, geometric mean, root mean square or any suitable aggregation method. The RBD values can then be assessed for each target. The method of calculating the aggregate data can use any of the aggregation methods described for the RBD weight averaging.

In the example above, the RBDs were sequentially assigned to the targets and ALUAs. Any other suitable initial assignment may be made. Further, client 1 112A and its virtual drive 116A1 may have been exported to RBD2 162A (shown by RBD2 and Client 1/Initiator 1 both having a preferred path through 136A-B-2) while client 2 112B and its virtual drive 116B1 have been exported to RBD8 (shown by RBD8 and Client 2/Initiator 2 both having a preferred path through 136A-B-2). Consequently, the targets for initiator 1 114A are the same as RBD 2 162B and those targets for initiator 114B are the same as RBD 8 162H. The cells containing an "X" above in Table 1 denote a preferred path connection from the RBD to the ALUA Group A-C, and a preferred path connection between the ALUA Group A-C and the initiator/client. The preferred path may be to a target 136 in ALUA A-C 134 of that node (A through D). The other paths may be non-preferred ones.

The paths between targets and initiator/clients may be separately specified. For example, client 1 112A with initiator 114A may connect to RBD 2 162B via ALUA group A 134A-A in node A 132A; ALUA group A 134A-B in node B 132B; ALUA group A 134A-C in node C 132C; and ALUA group A 134A-D in node D 132D. ALUA group A 134B in node B 132B may be the preferred connection. Other connections represented may be non-preferred connections.

The RBD weights may calculated on a periodic basis. The periodic basis may be defined by a predefined value. This initial iteration, iteration 1, is a representation of a starting configuration prior to balancing. Example values of calculated RBW weights are illustrated in the mapping table as follows as shown in Table 3.

TABLE 3

| | | | | | | | | ALUA Group 1 preferred path | | | | | | |
|---|---|---|---|---|---|---|---|---|---|---|---|---|---|---|
| | RBD Weighting values | | | | | | | Node | Node | Node | Node | | | |
| RBD | IOPSR | IOPSW | TPR | TPW | LATR | LATW | Wt. | A | B | C | D | | | |
| RBD 1 | 332 | 4,349 | 858,804,976 | 539,579,914 | 146 | 15 | 0.10 | X | | | | | | |
| RBD 2 | 2,523 | 1,453 | 400,772,322 | 319,726,948 | 67 | 474 | 1.80 | | X | | | | | |
| RBD 3 | 9,931 | 5,642 | 778,731,144 | 548,680,147 | 320 | 304 | 2.61 | | | X | | | | |
| RBD 4 | 6,946 | 3,116 | 533,398,768 | 228,855,890 | 216 | 416 | 4.72 | | | | X | | | |
| RBD 5 | 4,293 | 1,158 | 170,592,597 | 645,323,239 | 426 | 129 | 0.19 | X | | | | | | |
| RBD 6 | 2,873 | 3,090 | 739,126,972 | 571,643,149 | 434 | 72 | 0.32 | | X | | | | | |
| RBD 7 | 9,272 | 1,995 | 54,986,687 | 77,282,905 | 306 | 119 | 2.57 | | | X | | | | |
| RBD 8 | 8,625 | 1,356 | 869,481,393 | 737,816,970 | 391 | 139 | 0.21 | | | | X | | | |
| RBD 9 | 3,066 | 2,777 | 687,575,049 | 358,598,218 | 42 | 398 | 2.57 | X | | | | | | |
| RBD 10 | 8,613 | 6,509 | 388,634,661 | 917,478,148 | 444 | 321 | 1.90 | | X | | | | | |
| RBD 11 | 2,970 | 7,400 | 112,108,251 | 334,865,662 | 489 | 160 | 2.95 | | | X | | | | |
| RBD 12 | 6,855 | 4,265 | 780,451,187 | 536,110,920 | 88 | 265 | 1.76 | | | | X | | | |
| | | | | | | | | | X | | | Initiator 1 | Client 1 | |
| | | | | | | | | | | | X | Initiator 2 | Client 2 | |

At 215, it may be determined whether to balance the load for a given target. The balancing of different targets may be selectively applied on a periodic basis, upon an error or slow-down condition, or upon any other suitable basis. The balancing of a given target may also be made if the target has a preferred path. If so, method 200 may proceed to 220. Otherwise, method 200 may return to 210. Moreover, 210 may be performed in parallel with the balancing of a load of a given target. Moreover, the balancing of a load of a given target may be done in parallel with the balancing of loads of other targets.

At 220, a target goal for optimized node loading for a target may be calculated.

A target goal for optimized node loading can be calculated as follows (using an arithmetic average):

Node Goal=(sum(individual RBD values)/(number of RBD devices))*((number of RBD devices)/(number of nodes))

In the example, since there are 12 RBD devices and 4 nodes this will result in

Node Goal=(sum(RBD 1 through RBD 12)/12)*3

Furthermore, node variance may be given as

Node Variance=Node Goal−sum(weight of preferred paths on the node)

Node Variance %=(Node Variance/Node Goal)*100

The node goal may thus be (sum(RBD 1 through RBD 12)/12)*3=21.7/12*3=5.424. The following table shows the loading calculation for the initial configuration of preferred paths, yielding an overall node variance for each node given the weights of the preferred paths on the give node.

TABLE 4

Loading calculation for initial configuration of preferred paths

| Node | | Initial Configuration Iteration 1 | | | Total Weight | Node Variance = Node Goal − Total Weight | Node Variance % = (Node Goal − Total Node weight)/Node Goal |
|---|---|---|---|---|---|---|---|
| Node A | RBD | RBD 1 | RBD 5 | RBD 9 | | | |
| | Weight | 0.10 | 0.19 | 2.57 | 2.86 | 2.56 | 47.20% |
| Node B | RBD | RBD 2 | RBD 6 | RBD 10 | | | |
| | Weight | 1.80 | 0.32 | 1.90 | 4.02 | 1.41 | 25.06% |
| Node C | RBD | RBD 3 | RBD 7 | RBD 11 | | | |
| | Weight | 2.61 | 2.57 | 2.95 | 8.12 | −2.70 | −49.75% |
| Node D | RBD | RBD 4 | RBD 8 | RBD 12 | | | |
| | Weight | 4.72 | 0.21 | 1.76 | 6.69 | −1.27 | −23.35% |

The following table shows the node loading weight summed from the constituent RBDs as shown in the above table, prior to any balancing, and the variance from the node goal.

TABLE 5

| Sums of loading and variance before balancing - iteration 1 | | | |
|---|---|---|---|
| Before Balancing | Total weight | Node Variance | Node Variance % |
| Node A | 2.86 | 2.56 | 47.20% |
| Node B | 4.02 | 1.41 | 25.90% |
| Node C | 8.12 | -2.70 | -49.75% |
| Node D | 6.69 | -1.27 | -23.25 |

As can be seen from this table above, the variance from the node goal is very high. A decision can be made to rebalance the loading between the nodes and reduce the variance. At 225, it may be determined whether node variances exceed a threshold. This decision may depend on a predefined value of accepted variance, such as 5%. Performance monitor 170, which may calculate these values, may trigger a preferred path balancing if a node variance exceeds this predetermined value. For example, method 200 may proceed to 230 if node variances exceed a threshold, and otherwise proceed to 250.

A load balancing algorithm can be used to rebalance the preferred paths. The balancing may be accomplished in multiple iterations. At 230, the RDBs may first be arranged in a table by descending weight.

TABLE 6

| Sorted weight values | | | |
|---|---|---|---|
| Initial Values | | Sorted Values | |
| RBD | Weight Values | RBD | Weight Values |
| RBD 1 | 0.10 | RBD 4 | 4.72 |
| RBD 2 | 1.80 | RBD 11 | 2.95 |
| RBD 3 | 2.61 | RBD 3 | 2.61 |
| RBD 4 | 4.72 | RBD 7 | 2.57 |
| RBD 5 | 0.19 | RBD 9 | 2.57 |
| RBD 6 | 0.32 | RBD 10 | 1.90 |
| RBD 7 | 2.57 | RBD 2 | 1.80 |
| RBD 8 | 0.21 | RBD 12 | 1.76 |
| RBD 9 | 2.57 | RBD 6 | 0.32 |
| RBD 10 | 1.90 | RBD 8 | 0.21 |
| RBD 11 | 2.95 | RBD 5 | 0.19 |
| RBD 12 | 1.76 | RBD 1 | 0.10 |

At 235, the RBDs may be allocated to the nodes in turn in a round-robin manner, starting with the highest weighted RBDs. In the second iteration, shown below in Table 7, the highest weighted RBDs are allocated to the nodes in turn. This may be performed in a round-robin manner. Given four nodes, each of the four nodes may be allocated one of the highest four weighted RBDs. Thus, the X highest weighted RBDs are distributed among all the different X nodes. The sum of the weights of each allocated RBD is subtracted from the node goal to leave the remaining load balance weight, or node variance. These results are shown in the column "Iteration 2".

At 240, the remaining RBDs may be allocated to the nodes. A third, and subsequent iterations are carried out as follows. For each node, the weights of the already-associated RBDs (from the prior iterations) are summed. From the remaining unassigned RBDs, the unassigned RBD with the lowest weight is assigned to the node with the largest RBD weight sum. The unassigned RBD with the second lowest weight is assigned to the node with the second highest RBD weight sum. The RBD with the third lowest weight is assigned to the node with the third highest weight sum. In the general case, the RBD with the nth lowest weight is assigned to the node with the nth largest weight sum. This process is repeated until all of the remaining unassigned RBDs have been assigned to a node. In the case where the node variance has significantly exceeded the optimized target weight (by more than 10%, for example), no additional RBDs are assigned to that node. This will be seen later in the worked example. Once the RBDs have been assigned, a new node variance is calculated Eventually, all of the RBDs may be allocated. This may result in the following initial distributions for this example.

TABLE 7

| Iterations for selecting load balanced assignments | | | | |
|---|---|---|---|---|
| Node | | Iteration 2 | Iteration 3 | Iteration 4 |
| Node A | RBD | RBD 4 | RBD 1 | RBD 12 |
| | Weight | 4.72 | 0.10 | 1.76 |
| | Node Variance | 0.70 | 0.60 | -1.15 |
| Node B | RBD | RBD 11 | RBD 5 | RBD 2 |
| | Weight | 2.95 | 0.19 | 1.80 |
| | Node Variance | 2.48 | 2.28 | 0.49 |
| Node C | RBD | RBD 3 | RBD 8 | RBD 10 |
| | Weight | 2.61 | 0.21 | 1.90 |
| | Node Variance | 2.82 | 2.61 | 0.71 |
| Node D | RBD | RBD 7 | RBD 6 | RBD 9 |
| | Weight | 2.57 | 0.32 | 2.57 |
| | Node Variance | 2.86 | 2.53 | -0.04 |

At the end of the fourth iteration there may still be a wide difference in the resulting load balance weights for each target as follows. Thus, each node, though relatively weighted, may include preferred paths that vary wildly in terms of variance from node to node. At 245, the variances may be compared against a threshold, such as 5% (in terms of absolute value, in which case nodes A, B, and C may exceed the threshold. In another example, the variances may be compared against the variances resulting node weight among all the nodes, such as 1.0.

TABLE 8

| Results of load balancing selections | | |
|---|---|---|
| Node | Resulting Node Weight | Resulting Node Variance |
| A | 6.58 | -21.28 |
| B | 4.94 | 8.96 |
| C | 4.72 | 13.01 |
| D | 5.46 | -0.69 |

To further balance the loading and create a smaller range of target load balance weights the following algorithm may be used.

Two of the nodes are selected, the one with the highest weight and the one with the lowest weight. In the above example, this would be nodes A and C. A balancing target is then computed as the difference between the weights divided by 2. A matrix is then constructed of the difference in the individual RBD weights between the two selected nodes. The pair of RBDs that most closely match the balancing target are chosen. They are then swapped between the two nodes.

TABLE 9

| Differences in individual RBD weights between the nodes Balancing Node = Node A Variance − Node C Variance 0.93 | | | | |
|---|---|---|---|---|
| Adjustment value | | Node A | | |
| Node A RBD − Node C RBD | | RBD 4 | RBD 1 | RBD 12 |
| Node C | RBD 3 | 2.11 | −2.50 | −0.85 |
| | RBD 10 | 2.82 | −1.80 | −0.14 |
| | RBD 8 | 4.51 | −0.11 | 1.54 |

As shown in Table 9, the pair of RBDs 8, 12 have a difference of 1.54, which more closely matches, compared to any other pair of RBDs, the balancing target value of 0.93. As a result, the preferred path for RBD 8 may be moved from Node C to Node A. The preferred path for RBD 12 will be moved from Node A to Node C. This may result in a new RBD configuration as follows

TABLE 10

| Results after adjustment | | | | | | |
|---|---|---|---|---|---|---|
| Node | | | | Iteration 5 | | |
| Node A | RBD | RBD 4 | RBD 1 | RBD 8 | Total Weight | Node Variance |
| | Weight | 4.72 | 0.10 | 0.21 | 5.03 | 7.18% |
| | Node Variance | 0.70 | 0.60 | 0.39 | | |
| Node B | RBD | RBD 11 | RBD 5 | RBD 2 | | |
| | Weight | 2.95 | 0.19 | 1.80 | 4.94 | 8.96% |
| | Node Variance | 2.48 | 2.28 | 0.49 | | |
| Node C | RBD | RBD 3 | RBD 12 | RBD 10 | | |
| | Weight | 2.61 | 1.76 | 1.90 | 6.26 | −15.45% |
| | Node Variance | 2.82 | 1.06 | −0.84 | | |
| Node D | RBD | RBD 7 | RBD 6 | RBD 9 | | |
| | Weight | 2.57 | 0.32 | 2.57 | 5.46 | −0.69% |
| | Node Variance | 2.86 | 2.53 | −0.04 | | |

It can be seen that the range of aggregate node load weights has been reduced. However, the process can be repeated again using Node C and Node B. Thus, method 200 may return to 245. Two of the nodes are selected, the one with the highest weight and the one with the lowest weight. In the above example, this would be nodes C and B. A balancing target is then computed as the difference between the weights divided by 2, which would be 0.66. A matrix is then constructed of the difference in the individual RBD weights between the two selected nodes. The pair of RBDs that most closely match the balancing target are chosen to be swapped. This is shown in the following matrix.

TABLE 11

| Differences between nodes Balancing Node = Node C Variance − Node B Variance 0.66 | | | | |
|---|---|---|---|---|
| | | Node C | | |
| Adjustment value Node C RBD − Node B RBD | | RBD 3 = 2.61 | RBD 12 = 1.76 | RBD 10 = 1.90 |
| Node B | RBD 11 = 2.95 | −0.34 | −1.19 | −1.05 |
| | RBD 5 = .19 | 2.41 | 1.56 | 1.70 |
| | RBD 2 = 1.8 | 0.81 | −0.04 | 0.10 |

As shown in Table 11, the pair of RBDs 2, 3 have a difference of 0.81, which more closely matches, compared to any other pair of RBDs, the balancing target value of 0.66. In this instance, RBD 2 preferred path on Node B is swapped with RBD 3 in Node C resulting in the following load distribution.

TABLE 12

| Results after adjustment | | | | | | |
|---|---|---|---|---|---|---|
| Node | | | | Iteration 6 | | |
| Node A | RBD | RBD 4 | RBD 1 | RBD 8 | Total Weight | Node Variance |
| | Weight | 4.72 | 0.10 | 0.21 | 5.03 | 7.18% |
| | Node Variance | 0.70 | 0.60 | 0.39 | | |
| Node B | RBD | RBD 11 | RBD 5 | RBD 3 | | |
| | Weight | 2.95 | 0.19 | 2.61 | 5.75 | −5.99% |
| | Node Variance | 2.48 | 2.28 | −0.32 | | |
| Node C | RBD | RBD 2 | RBD 12 | RBD 10 | | |
| | Weight | 1.80 | 1.76 | 1.90 | 5.45 | −0.50% |
| | Node Variance | 3.63 | 1.87 | −0.03 | | |
| Node D | RBD | RBD 7 | RBD 6 | RBD 9 | | |
| | Weight | 2.57 | 0.32 | 2.57 | 5.46 | −0.69% |
| | Node Variance | 2.86 | 2.53 | −0.04 | | |

At this point half the difference between the highest and lowest target load balance weights (node A and node B) is only 0.36. This may be too small to allow any new swapping of RBDs to result in a more optimized distribution as it is significantly smaller than any of the RBD weight differentials. Thus, at this instance of 245, the node variances might not exceed the threshold and method 200 may proceed to 250.

For illustrative purposes, the results that would occur if swapping did indeed happen are shown. The resulting balancing matrix shows that if swapping was done, then preferred paths for RBD 5 and 8 should be swapped.

TABLE 13

| Differences between nodes Balancing Node = Node B Variance − Node A Variance 0.36 | | | | |
|---|---|---|---|---|
| Adjustment value | | Node B | | |
| Node B RBD − Node A RBD | | RBD 11 | RBD 5 | RBD 3 |
| Node A | RBD 4 | −2.11 | −2.96 | −2.82 |
| | RBD 1 | 2.50 | 1.66 | 1.80 |
| | RBD 8 | 2.39 | 1.54 | 1.69 |

If the preferred paths for RBD 5 and RBD 8 are swapped, then this is the resulting configuration.

TABLE 14

| Potential results after adjustment | | | | |
|---|---|---|---|---|
| Node | | | Iteration 7 | |
| Node A | BD | BD 4 | BD 1 | BD 5 |
| | eight | .72 | .10 | .19 |
| | Node Variance | 0.70 | 0.60 | 0.41 |
| Node B | RBD | RBD 11 | RBD 8 | RBD 3 |
| | Weight | 2.95 | 0.21 | 2.61 |
| | Node Variance | 2.48 | 2.26 | −0.34 |

TABLE 14-continued

| Node | | | Iteration 7 | |
|---|---|---|---|---|
| Node C | RBD | RBD 2 | RBD 12 | RBD 10 |
| | Weight | 1.80 | 1.76 | 1.90 |
| | Node Variance | 3.63 | 1.87 | −0.03 |
| Node D | RBD | RBD 7 | RBD 6 | RBD 9 |
| | Weight | 2.57 | 0.32 | 2.57 |
| | Node Variance | 2.86 | 2.53 | −0.04 |

The resulting balancing table would define that RBD 5 and RBD 8 are swapped back. Therefore, the swapping of RBD5 and RBD 8 are not performed and the previous iteration provides the optimized configuration.

TABLE 15

Potential differences between nodes
Balancing Node = Node B Variance − Node A Variance 0.38

| Adjustment value | | Node B | | |
|---|---|---|---|---|
| Node B RBD − Node A RBD | | RBD 11 | RBD 5 | RBD 3 |
| Node A | RBD 4 | −2.11 | −2.96 | −2.82 |
| | RBD 1 | 2.50 | 1.66 | 1.80 |
| | RBD 8 | 2.39 | 1.54 | 1.69 |

By limiting the number of iterations in this fashion, method 200 may prevent future attempts of load balancing where the same RDBs are moved between nodes. This will result in less chance of unnecessary preferred route changes for each target, also called target state thrashing. This has now significantly decreased the range of target load values as follows:

TABLE 14

Results after different iterations

| Node | Resulting load variance after 4th iteration | Resulting load variance after 6th iteration |
|---|---|---|
| 1 | −1.15 | 0.39 |
| 2 | 0.49 | −0.32 |
| 3 | 1.90 | −0.03 |
| 4 | −0.04 | −0.04 |

At 250, method 200 may terminate.

Figure 3:
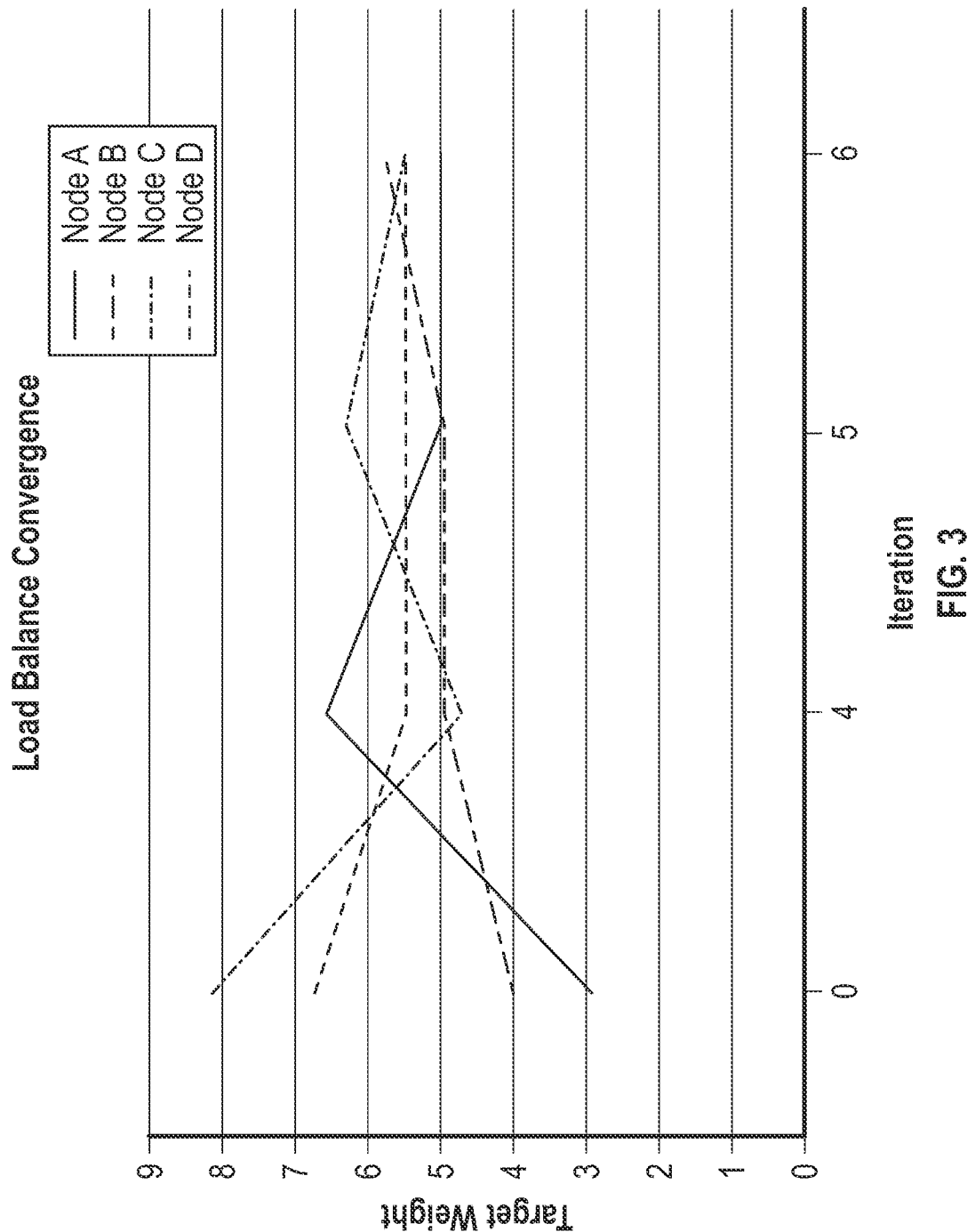
FIG. 3 is an illustration of operation of nodes of the system before load balancing and after load balancing, according to embodiments of the present disclosure.

FIG. 3 is an illustration of the load balancing convergence process.

Below is the comparison between the total load weights for each target before and after balancing.

TABLE 15

Results after convergence

| | Before Balancing | Node Variance | After Balancing | Node Variance |
|---|---|---|---|---|
| Node A | 2.86 | 47.20% | 5.03 | 7.18% |
| Node B | 4.02 | 25.90% | 5.75 | −5.99% |
| Node C | 8.12 | −49.75% | 5.45 | −0.50% |
| Node D | 6.69 | −23.35% | 5.46 | −0.69% |

Figure 4:
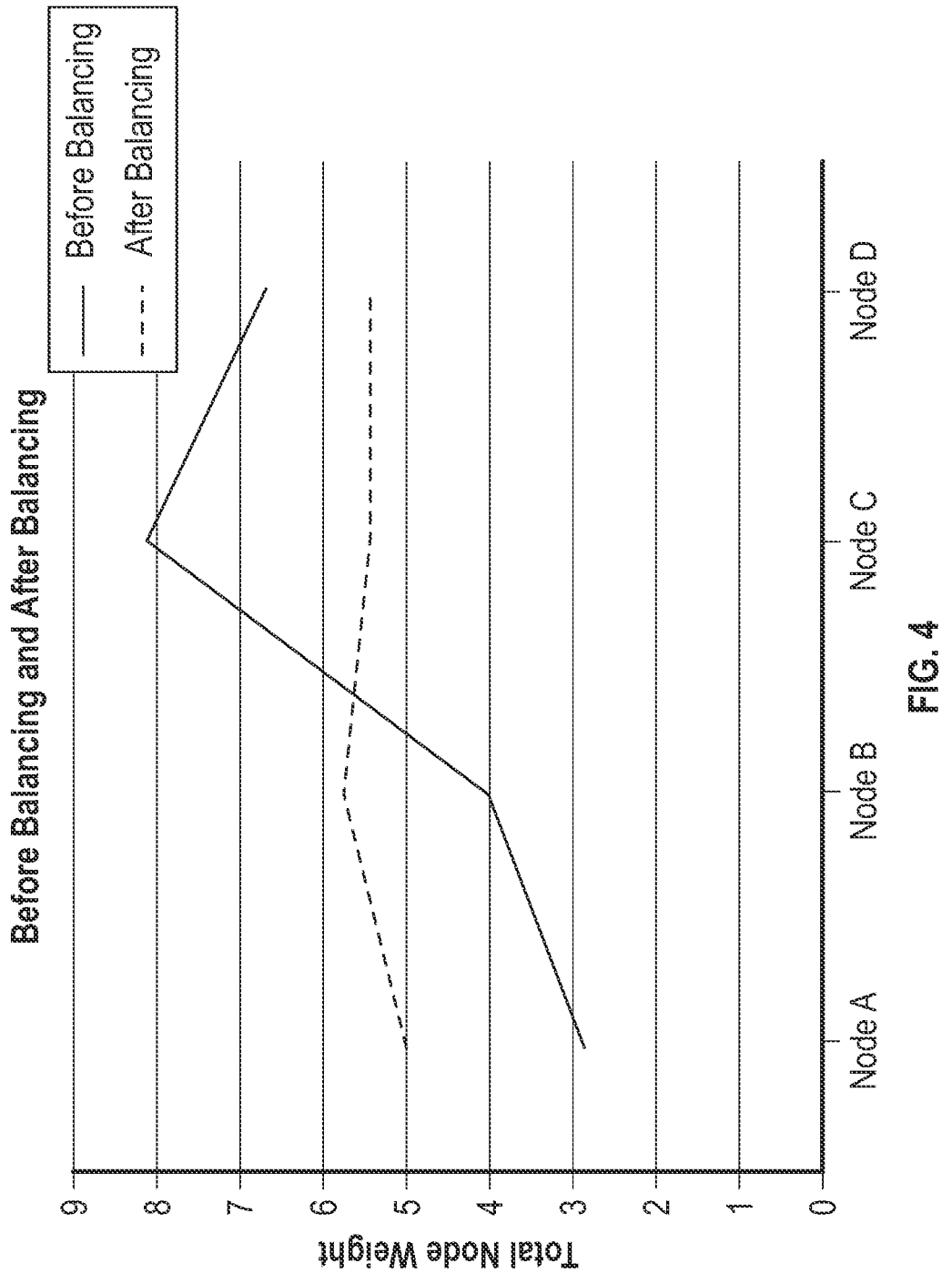
FIG. 4 is an illustration, that graphically illustrates, the effect to load balancing on aggregate node weight.

FIG. 4 illustrates, graphically, the effect to load balancing on aggregate node weight.

Further it can be seen that the node variance in the balanced configuration has reduced significantly and would be below the example target of 5%. This qualifies as an acceptable new load balance configuration.

After balancing the connection table would be reconfigured as follows.

TABLE 16

Load Balanced Configuration

| | RBD Weighting values | | | | | | | ALUA Group 1 preferred path | | | |
|---|---|---|---|---|---|---|---|---|---|---|---|
| RBD | IOPSR | IOPSW | TPR | TPW | LATR | LATW | Wt. | Node A | Node B | Node C | Node D |
| RBD 1 | 332 | 4,349 | 858K | 539K | 146 | 15 | 0.10 | X | | | |
| RBD 2 | 2,523 | 1,453 | 400K | 319K | 67 | 474 | 1.80 | | | X | |
| RBD 3 | 9,931 | 5,642 | 778K | 548K | 320 | 304 | 2.61 | | X | | |
| RBD 4 | 6,946 | 3,116 | 533K | 228K | 216 | 416 | 4.72 | X | | | |
| RBD 5 | 4,293 | 1,158 | 170K | 645K | 426 | 129 | 0.19 | | X | | |
| RBD 6 | 2,873 | 3,090 | 739K | 571K | 434 | 72 | 0.32 | | | | X |
| RBD 7 | 9,272 | 1,995 | 54K | 77K | 306 | 119 | 2.57 | | | | X |
| RBD 8 | 8,625 | 1,356 | 869K | 737K | 391 | 139 | 0.21 | X | | | |
| RBD 9 | 3,066 | 2,777 | 687K | 358K | 42 | 398 | 2.57 | | | | X |
| RBD 10 | 8,613 | 6,509 | 388K | 917K | 444 | 321 | 1.90 | | | X | |
| RBD 11 | 2,970 | 7,400 | 112K | 334K | 489 | 160 | 2.95 | | X | | |
| RBD 12 | 6,855 | 4,265 | 780K | 536K | 88 | 265 | 1.76 | | X | | |

I1   C1

X                I2   C2

The following table shows how RBD 162, Client 1 112A and Client 2 112B are moved to different targets from the original configuration to provide a balanced load.

TABLE 17

| | | Assignments after adjustment | | |
| --- | --- | --- | --- | --- |
| RBD | Initial Node | Initial Target | New Node | New Target |
| RBD 1 | Node A | 136 A-1 | Node B | 136 B-1 |
| RBD 2 | Node B | 136 B-2 | Node D | 136 D-2 |
| RBD 3 | Node C | 136 C-3 | Node C | 136 C-3 |
| RBD 4 | Node D | 136 D-4 | Node A | 136 A-4 |
| RBD 5 | Node A | 136 A-5 | Node C | 136 C-5 |
| RBD 6 | Node B | 136 B-6 | Node A | 136 A-6 |
| RBD 7 | Node C | 136 C-7 | Node B | 136 B-7 |
| RBD 8 | Node D | 136 D-8 | Node A | 136 A-8 |
| RBD 9 | Node A | 136 A-9 | Node C | 136 C-9 |
| RBD 10 | Node B | 136 B-10 | Node D | 136 D-10 |
| RBD 11 | Node C | 136 C-11 | Node B | 136 B-11 |
| RBD 12 | Node D | 136 D-12 | Node D | 136 D-12 |
| Client 1 | Node B | 136 B-1 | Node D | 136 D-1 |
| Client 2 | Node D | 136 D-2 | Node A | 136 A-2 |

Once an acceptable configuration has been completed, performance monitor 170 can advertise the new preferred paths to the performance state monitors 145 of each node 132. Performance monitor 170 may continue to periodically measure the RBD performance data and compute the overall node goal and each node variance. If the variance exceeds a predefined value, a new preferred path configuration may be advertised by performance monitor 170 to performance state monitors 146. Each performance state monitor 146 may receive and implement the advertised preferred path configuration simultaneously. If not conducted simultaneously, differences between the current configuration and the new configuration can result in an RBD 162 having multiple preferred paths, which may be unacceptable.

Embodiments of the present disclosure may include an article of manufacture. The article may include a non-transitory machine readable medium, the medium including instructions, the instructions, when read and executed by the processor, for causing the processor to identify a client machine to connect to one of a plurality of LUNs in a SDS through a mesh network. The client machine may be to connect to a given one of the LUNs through one of a plurality of gateway nodes. The mesh network may include two or more ALUA port groups, wherein each ALUA port group is to include a possible connection to each of the LUNs and to the client. Each gateway node may include an instance of each of the plurality of ALUA port groups. The instructions may cause the processor to balance a bandwidth load for a given ALUA across each of the plurality of gateway nodes through assignment of the LUNs in the given ALUA across the plurality of gateway nodes. The instructions may cause the processor to select, as a preferred path, a path from the client machine through a selected one of the plurality of gateway nodes to an assigned LUN from the assignment of the LUNs in the given ALUA across the plurality of gateway nodes.

In combination with any of the above embodiments, the instructions may cause the processor to balance the bandwidth load for the given ALUA across each of the plurality of gateway nodes by causing the processor to determine a load weight of each LUN in the given ALUA, determine a node goal weight for all of the LUNs in the given ALUA, determine from an initial assignment of the LUNs in the given ALUA across the plurality of gateway nodes a variance of each of the LUNs from the node goal weight, assign N of the LUNs to N different gateway nodes, wherein there are N different gateway nodes in a first iteration, and assign an unassigned LUN to each of the N different gateway nodes by matching a weight of a given unassigned LUN to a given gateway node with a closet variance from the node goal weight in a second iteration.

In combination with any of the above embodiments, the instructions may cause the processor to, in the first iteration, assign N of the LUNs to N different gateway nodes by selecting the N LUNs with the highest weight.

In combination with any of the above embodiments, the instructions may cause the processor to balance the bandwidth load for the given ALUA across each of the plurality of gateway nodes by causing the processor to, in a third iteration, for each gateway node, sum the weights of all already-assigned LUNs and from remaining unassigned LUNs, select a lowest weighted LUN and assign the lowest weighted LUN to a given gateway node with a highest summed weight from all already-assigned LUNs.

In combination with any of the above embodiments, the instructions may cause the processor to balance the bandwidth load for the given ALUA across each of the plurality of gateway nodes by causing the processor to, after assignment of all LUNs to the plurality of gateway nodes, select a first gateway node of the plurality of gateway nodes, the first gateway node having a lowest aggregate weight of assigned LUNs in the given ALUA, select a second gateway node of the plurality of gateway nodes, the second gateway node having a highest aggregate weight of assigned LUNs in the given ALUA, evaluate a difference of weight between each assigned LUN assigned to the first gateway node and each assigned LUN assigned to the second gateway node to select a first pair of LUNs (wherein the first pair of LUNs to include a first LUN assigned to the first gateway node and a second LUN assigned to the second gateway node) that have a lowest differential of weights compared to all combinations of LUNs between the first and second gateway nodes, and, based on the difference of weight between each assigned LUN assigned to the first gateway node and each assigned LUN assigned to the second gateway node, assign the first LUN to the second gateway node in the given ALUA and assign the second LUN to the first gateway node in the given ALUA.

In combination with any of the above embodiments, the instructions may cause the processor to balance the bandwidth load for the given ALUA across each of the plurality of gateway nodes by causing the processor to, after assignment of the first LUN to the second gateway node in the given ALUA and after assignment of the second LUN to the first gateway node in the given ALUA, select a third gateway node of the plurality of gateway nodes, the third gateway node having a lowest aggregate weight of assigned LUNs in the given ALUA, select a fourth gateway node of the plurality of gateway nodes, the fourth gateway node having a highest aggregate weight of assigned LUNs in the given ALUA, evaluate a difference of weight between each assigned LUN assigned to the third gateway node and each assigned LUN assigned to the fourth gateway node to select a second pair of LUNs (wherein the second pair of LUNs to include a third LUN assigned to the third gateway node and a fourth LUN assigned to the fourth gateway node) that have a lowest differential of weights compared to all combinations of LUNs between the third and fourth gateway nodes, and, based on the difference of weight between each assigned LUN assigned to the third gateway node and each assigned LUN assigned to the fourth gateway node, assign the third LUN to the fourth gateway node in the given ALUA and assign the fourth LUN to the third gateway node in the given ALUA.

In combination with any of the above embodiments, the instructions may cause the processor to balance the bandwidth load for the given ALUA across each of the plurality of gateway nodes by causing the processor to, after assignment of the first LUN to the second gateway node in the given ALUA and after assignment of the second LUN to the first gateway node in the given ALUA, select the third gateway node, select the fourth gateway node, select the second pair of LUNs, assign the third LUN to the fourth gateway node, and assign the fourth LUN to the third gateway node in the given ALUA based upon a determination that assignment of the third LUN to the fourth gateway node and assignment of the fourth LUN to the third gateway node will decrease node variation.

Embodiments of the present disclosure may include an apparatus. The apparatus may include a processor and any of the articles of manufacture of the above embodiments.

Embodiments of the present disclosure may include a method performed by any of the above embodiments.

Although example embodiments have been described above, other variations and embodiments may be made from this disclosure without departing from the spirit and scope of these embodiments.

We claim:

1. An apparatus, comprising:
a processor; and
a non-transitory machine readable medium, the medium including instructions, the instructions, when read and executed by the processor, cause the processor to:
  identify a client machine to connect to one of a plurality of logical unit numbers (LUN) in a software defined system (SDS) through a mesh network, wherein:
    the client machine is to connect to a given one of the LUNs through one of a plurality of gateway nodes;
    the mesh network includes a plurality of Asymmetric Logical Unit Access (ALUA) port groups,
    each ALUA port group to include a possible connection to each of the LUNs and to the client; and
    each gateway node includes an instance of each of the plurality of ALUA port groups;
  balance a bandwidth load for a given ALUA across each of the plurality of gateway nodes through assignment of the LUNs in the given ALUA across the plurality of gateway nodes; and
  select, as a preferred path, a path from the client machine through a selected one of the plurality of gateway nodes to an assigned LUN from the assignment of the LUNs in the given ALUA across the plurality of gateway nodes; and
  wherein the medium includes instructions to cause the processor to balance the bandwidth load for the given ALUA across each of the plurality of gateway nodes by causing the processor to:
    determine a load weight of each LUN in the given ALUA;
    determine a node goal weight for all of the LUNs in the given ALUA;
    determine, from an initial assignment of the LUNs in the given ALUA across the plurality of gateway nodes, a variance of each of the LUNs from the node goal weight;
    in a first iteration, assign N of the LUNs to N different gateway nodes, wherein there are N different gateway nodes; and in a second iteration, assign an unassigned LUN to each of the N different gateway nodes by matching a weight of a given unassigned LUN to a given gateway node with a closet variance from the node goal weight.

2. The apparatus of claim 1, wherein the medium includes instructions to cause the processor to, in the first iteration, assign N of the LUNs to N different gateway nodes by selecting the N LUNs with the highest weight.

3. The apparatus of claim 1, wherein the medium includes instructions to cause the processor to balance the bandwidth load for the given ALUA across each of the plurality of gateway nodes by causing the processor to, in a third iteration: for each gateway node, sum the weights of all already-assigned LUNs; and from remaining unassigned LUNs, select a lowest weighted LUN and assign the lowest weighted LUN to a given gateway node with a highest summed weight from all already-assigned LUNs.

4. The apparatus of claim 1, wherein the medium includes instructions to cause the processor to balance the bandwidth load for the given ALUA across each of the plurality of gateway nodes by causing the processor to, after assignment of all LUNs to the plurality of gateway nodes:
  select a first gateway node of the plurality of gateway nodes, the first gateway node having a lowest aggregate weight of assigned LUNs in the given ALUA;
  select a second gateway node of the plurality of gateway nodes, the second gateway node having a highest aggregate weight of assigned LUNs in the given ALUA;
  evaluate a difference of weight between each assigned LUN assigned to the first gateway node and each assigned LUN assigned to the second gateway node to select a first pair of LUNs, the first pair of LUNs to include a first LUN assigned to the first gateway node and a second LUN assigned to the second gateway node, that have a lowest differential of weights compared to all combinations of LUNs between the first and second gateway nodes;
  based on the difference of weight between each assigned LUN assigned to the first gateway node and each assigned LUN assigned to the second gateway node:
    assign the first LUN to the second gateway node in the given ALUA; and
    assign the second LUN to the first gateway node in the given ALUA.

5. The apparatus of claim 4, wherein the medium includes instructions to cause the processor to balance the bandwidth load for the given ALUA across each of the plurality of gateway nodes by causing the processor to, after assignment of the first LUN to the second gateway node in the given ALUA and after assignment of the second LUN to the first gateway node in the given ALUA:
  select a third gateway node of the plurality of gateway nodes, the third gateway node having a lowest aggregate weight of assigned LUNs in the given ALUA;
  select a fourth gateway node of the plurality of gateway nodes, the fourth gateway node having a highest aggregate weight of assigned LUNs in the given ALUA;
  evaluate a difference of weight between each assigned LUN assigned to the third gateway node and each assigned LUN assigned to the fourth gateway node to select a second pair of LUNs, the second pair of LUNs to include a third LUN assigned to the third gateway node and a fourth LUN assigned to the fourth gateway node, that have a lowest differential of weights compared to all combinations of LUNs between the third and fourth gateway nodes;

based on the difference of weight between each assigned LUN assigned to the third gateway node and each assigned LUN assigned to the fourth gateway node:
assign the third LUN to the fourth gateway node in the given ALUA; and
assign the fourth LUN to the third gateway node in the given ALUA.

6. The apparatus of claim 4, wherein the medium includes instructions to cause the processor to balance the bandwidth load for the given ALUA across each of the plurality of gateway nodes by causing the processor to, after assignment of the first LUN to the second gateway node in the given ALUA and after assignment of the second LUN to the first gateway node in the given ALUA, select the third gateway node, select the fourth gateway node, select the second pair of LUNs, assign the third LUN to the fourth gateway node, and assign the fourth LUN to the third gateway node in the given ALUA based upon a determination that assignment of the third LUN to the fourth gateway node and assignment of the fourth LUN to the third gateway node will decrease node variation.

7. An article of manufacture comprising a non-transitory machine readable medium, the medium including instructions, the instructions, when read and executed by a processor, cause the processor to:
identify a client machine to connect to one of a plurality of logical unit numbers (LUN) in a software defined system (SDS) through a mesh network, wherein: the client machine is to connect to a given one of the LUNs through one of a plurality of gateway nodes;
the mesh network includes a plurality of Asymmetric Logical Unit Access (ALUA) port groups, each ALUA port group to include possible connection to each of the LUNs and to the client; and each gateway node includes an instance of each of the plurality of ALUA port groups;
balance a bandwidth load for a given ALUA across each of the plurality of gateway nodes through assignment of the LUNs in the given ALUA across the plurality of gateway nodes; and
select, as a preferred path, a path from the client machine through a selected one of the plurality of gateway nodes to an assigned LUN from the assignment of the LUNs in the given ALUA across the plurality of gateway nodes; and
wherein the medium includes instructions to cause the processor to balance the bandwidth load for the given ALUA across each of the plurality of gateway nodes by causing the processor to:
determine a load weight of each LUN in the given ALUA;
determine a node goal weight for all of the LUNs in the given ALUA;
determine, from an initial assignment of the LUNs in the given ALUA across the plurality of gateway nodes, a variance of each of the LUNs from the node goal weight;
in a first iteration, assign N of the LUNs to N different gateway nodes, wherein there are N different gateway nodes; and
in a second iteration, assign an unassigned LUN to each of the N different gateway nodes by matching a weight of a given unassigned LUN to a given gateway node with a closet variance from the node goal weight.

8. The article of claim 7, wherein the medium includes instructions to cause the processor to, in the first iteration, assign N of the LUNs to N different gateway nodes by selecting the N LUNs with the highest weight.

9. The article of claim 7, wherein the medium includes instructions to cause the processor to balance the bandwidth load for the given ALUA across each of the plurality of gateway nodes by causing the processor to, in a third iteration:
for each gateway node, sum the weights of all already-assigned LUNs; and
from remaining unassigned LUNs, select a lowest weighted LUN and assign the lowest weighted LUN to a given gateway node with a highest summed weight from all already-assigned LUNs.

10. The article of claim 7, wherein the medium includes instructions to cause the processor to balance the bandwidth load for the given ALUA across each of the plurality of gateway nodes by causing the processor to, after assignment of all LUNs to the plurality of gateway nodes:
select a first gateway node of the plurality of gateway nodes, the first gateway node having a lowest aggregate weight of assigned LUNs in the given ALUA;
select a second gateway node of the plurality of gateway nodes, the second gateway node having a highest aggregate weight of assigned LUNs in the given ALUA;
evaluate a difference of weight between each assigned LUN assigned to the first gateway node and each assigned LUN assigned to the second gateway node to select a first pair of LUNs, the first pair of LUNs to include a first LUN assigned to the first gateway node and a second LUN assigned to the second gateway node, that have a lowest differential of weights compared to all combinations of LUNs between the first and second gateway nodes;
based on the difference of weight between each assigned LUN assigned to the first gateway node and each assigned LUN assigned to the second gateway node:
assign the first LUN to the second gateway node in the given ALUA; and
assign the second LUN to the first gateway node in the given ALUA.

11. The article of claim 10, wherein the medium includes instructions to cause the processor to balance the bandwidth load for the given ALUA across each of the plurality of gateway nodes by causing the processor to, after assignment of the first LUN to the second gateway node in the given ALUA and after assignment of the second LUN to the first gateway node in the given ALUA:
select a third gateway node of the plurality of gateway nodes, the third gateway node having a lowest aggregate weight of assigned LUNs in the given ALUA;
select a fourth gateway node of the plurality of gateway nodes, the fourth gateway node having a highest aggregate weight of assigned LUNs in the given ALUA;
evaluate a difference of weight between each assigned LUN assigned to the third gateway node and each assigned LUN assigned to the fourth gateway node to select a second pair of LUNs, the second pair of LUNs to include a third LUN assigned to the third gateway node and a fourth LUN assigned to the fourth gateway node, that have a lowest differential of weights compared to all combinations of LUNs between the third and fourth gateway nodes;
based on the difference of weight between each assigned LUN assigned to the third gateway node and each assigned LUN assigned to the fourth gateway node:
assign the third LUN to the fourth gateway node in the given ALUA; and assign the fourth LUN to the third gateway node in the given ALUA.

12. The article of claim 10, wherein the medium includes instructions to cause the processor to balance the bandwidth load for the given ALUA across each of the plurality of gateway nodes by causing the processor to, after assignment of the first LUN to the second gateway node in the given ALUA and after assignment of the second LUN to the first gateway node in the given ALUA, select the third gateway node, select the fourth gateway node, select the second pair of LUNs, assign the third LUN to the fourth gateway node, and assign the fourth LUN to the third gateway node in the given ALUA based upon a determination that assignment of the third LUN to the fourth gateway node and assignment of the fourth LUN to the third gateway node will decrease node variation.

13. A method, comprising:
  identifying a client machine to connect to one of a plurality of logical unit numbers (LUN) in a software defined system (SDS) through a mesh network, wherein:
    the client machine is to connect to a given one of the LUNs through one of a plurality of gateway nodes;
    the mesh network includes a plurality of Asymmetric Logical Unit Access (ALUA) port groups, each ALUA port group to include possible connection to each of the LUNs and to the client; and
each gateway node includes an instance of each of the plurality of ALUA port groups;
balancing a bandwidth load for a given ALUA across each of the plurality of gateway nodes through assignment of the LUNs in the given ALUA across the plurality of gateway nodes;
  selecting, as a preferred path, a path from the client machine through a selected one of the plurality of gateway nodes to an assigned LUN from the assignment of the LUNs in the given ALUA across the plurality of gateway nodes; and
  balancing the bandwidth load for the given ALUA across each of the plurality of gateway nodes by:
    determining a load weight of each LUN in the given ALUA;
    determining a node goal weight for all of the LUNs in the given ALUA;
    determining, from an initial assignment of the LUNs in the given ALUA across the plurality of gateway nodes, a variance of each of the LUNs from the node goal weight;
    in a first iteration, assigning N of the LUNs to N different gateway nodes, wherein there are N different gateway nodes; and
    in a second iteration, assigning an unassigned LUN to each of the N different gateway nodes by matching a weight of a given unassigned LUN to a given gateway node with a closet variance from the node goal weight.

14. The method of claim 13, comprising, in the first iteration, assigning N of the LUNs to N different gateway nodes by selecting the N LUNs with the highest weight.

15. The method of claim 13, comprising balancing the bandwidth load for the given ALUA across each of the plurality of gateway nodes by causing the processor to, in a third iteration:
  for each gateway node, summing the weights of all already-assigned LUNs; and
  from remaining unassigned LUNs, selecting a lowest weighted LUN and assign the lowest weighted LUN to a given gateway node with a highest summed weight from all already-assigned LUNs.

16. The method of claim 13, comprising balancing the bandwidth load for the given ALUA across each of the plurality of gateway nodes by, after assignment of all LUNs to the plurality of gateway nodes:
  selecting a first gateway node of the plurality of gateway nodes, the first gateway node having a lowest aggregate weight of assigned LUNs in the given ALUA;
  selecting a second gateway node of the plurality of gateway nodes, the second gateway node having a highest aggregate weight of assigned LUNs in the given ALUA;
  evaluating a difference of weight between each assigned LUN assigned to the first gateway node and each assigned LUN assigned to the second gateway node to select a first pair of LUNs, the first pair of LUNs to include a first LUN assigned to the first gateway node and a second LUN assigned to the second gateway node, that have a lowest differential of weights compared to all combinations of LUNs between the first and second gateway nodes;
  based on the difference of weight between each assigned LUN assigned to the first gateway node and each assigned LUN assigned to the second gateway node:
    assign the first LUN to the second gateway node in the given ALUA; and
    assign the second LUN to the first gateway node in the given ALUA.

17. The method of claim 16, comprising balancing the bandwidth load for the given ALUA across each of the plurality of gateway nodes by to, after assignment of the first LUN to the second gateway node in the given ALUA and after assignment of the second LUN to the first gateway node in the given ALUA:
  selecting a third gateway node of the plurality of gateway nodes, the third gateway node having a lowest aggregate weight of assigned LUNs in the given ALUA;
  selecting a fourth gateway node of the plurality of gateway nodes, the fourth gateway node having a highest aggregate weight of assigned LUNs in the given ALUA;
  evaluating a difference of weight between each assigned LUN assigned to the third gateway node and each assigned LUN assigned to the fourth gateway node to select a second pair of LUNs, the second pair of LUNs to include a third LUN assigned to the third gateway node and a fourth LUN assigned to the fourth gateway node, that have a lowest differential of weights compared to all combinations of LUNs between the third and fourth gateway nodes; and
  based on the difference of weight between each assigned LUN assigned to the third gateway node and each assigned LUN assigned to the fourth gateway node:
    assigning the third LUN to the fourth gateway node in the given ALUA; and
    assigning the fourth LUN to the third gateway node in the given ALUA.

18. The method of claim 16, comprising balancing the bandwidth load for the given ALUA across each of the plurality of gateway nodes by causing the processor to, after assignment of the first LUN to the second gateway node in the given ALUA and after assignment of the second LUN to the first gateway node in the given ALUA, selecting the third gateway node, selecting the fourth gateway node, selecting the second pair of LUNs, assigning the third LUN to the fourth gateway node, and assigning the fourth LUN to the third gateway node in the given ALUA based upon a determination that assignment of the third LUN to the fourth gateway node and assignment of the fourth LUN to the third gateway node will decrease node variation.

* * * * *